US012571725B2

(12) United States Patent
Brown

(10) Patent No.: US 12,571,725 B2
(45) Date of Patent: Mar. 10, 2026

(54) OPTICAL CAVITY-ENHANCED FREQUENCY COMB SPECTROSCOPY

(71) Applicant: Honeywell International Inc., Charlotte, NC (US)

(72) Inventor: Andy Walker Brown, Richardson, TX (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 189 days.

(21) Appl. No.: 18/449,995

(22) Filed: Aug. 15, 2023

(65) Prior Publication Data

US 2025/0060307 A1 Feb. 20, 2025

(51) Int. Cl.
*G01N 21/25* (2006.01)
(52) U.S. Cl.
CPC . *G01N 21/255* (2013.01); *G01N 2201/06113* (2013.01)
(58) Field of Classification Search
CPC ............. G01N 21/255; G01N 21/3504; G01N 21/031; G01N 21/39; G01N 2201/06113; G01N 2021/399; G01N 2021/391; G01J 3/10; G01J 3/42
See application file for complete search history.

(56) References Cited

U.S. PATENT DOCUMENTS 7,538,881 B2 5/2009 Ye et al.
9,065,246 B2 6/2015 Kub et al.

2017/0140905 A1* 5/2017 Mihaylov ......... H01J 37/32917
2017/0256909 A1 9/2017 Braddell et al.
2018/0045561 A1* 2/2018 Leen ..................... G01J 3/0243
2018/0275050 A1 9/2018 Iguchi et al.

FOREIGN PATENT DOCUMENTS

CN 115561195 A 1/2023
EP 4068532 A1 10/2022
RU 2684937 C2 4/2019

OTHER PUBLICATIONS

Adam J. Fleisher et al., "Coherent cavity-enhanced dual-comb spectroscopy", Optics Express, 24(10):10424-10434, (May 4, 2016). with page numbers (Year: 2016).*

(Continued)

*Primary Examiner* — Dominic J Bologna
*Assistant Examiner* — Carlos Perez-Guzman
(74) *Attorney, Agent, or Firm* — Alston & Bird LLP

(57) ABSTRACT

An example apparatus, method, and system for determining a characteristic of a target gas in a fluid sample is provided. In some embodiments, the example apparatus includes a frequency comb illumination source configured to emit pulsed light having a plurality of frequency comb wavelengths. The apparatus also includes an optical cavity containing a fluid sample and exhibiting a plurality of cavity resonance modes. A frequency comb wavelength of the plurality of frequency comb wavelengths associated with the frequency comb illumination source is configured to align with a cavity resonance mode of the plurality of cavity resonance modes. A characteristic of the fluid sample is determined based on one or more optical characteristics of a transmitted light passing through the fluid sample within the optical cavity.

19 Claims, 9 Drawing Sheets

(56)     References Cited

OTHER PUBLICATIONS

Birgitta Bernhardt et al., "Cavity-enhanced dual-comb spectroscopy," Nature Photonics, 1-10, (Aug. 13, 2009). [Retrieved from the Internet Feb. 2, 2024: URL: <https://www.researchgate.net/publication/29600097_Cavity-Enhanced_Dual-Comb_Spectroscopy>].
Ian Coddington et al., "Dual-comb spectroscopy," Optica, 3(4):414-426, (Apr. 2016).
Adam J. Fleisher et al., "Coherent cavity-enhanced dual-comb spectroscopy," Optics Express, 24(10):10424-10434, (May 4, 2016).
Birgitta Bernhardt et al., "Cavity-enhanced dual-comb spectroscopy," Nature Photonics, 4(1): 55-57, (Nov. 29, 2009).
Extended European Search Report Mailed on Dec. 23, 2024 for EP Application No. 24187945, 10 page(s).

* cited by examiner

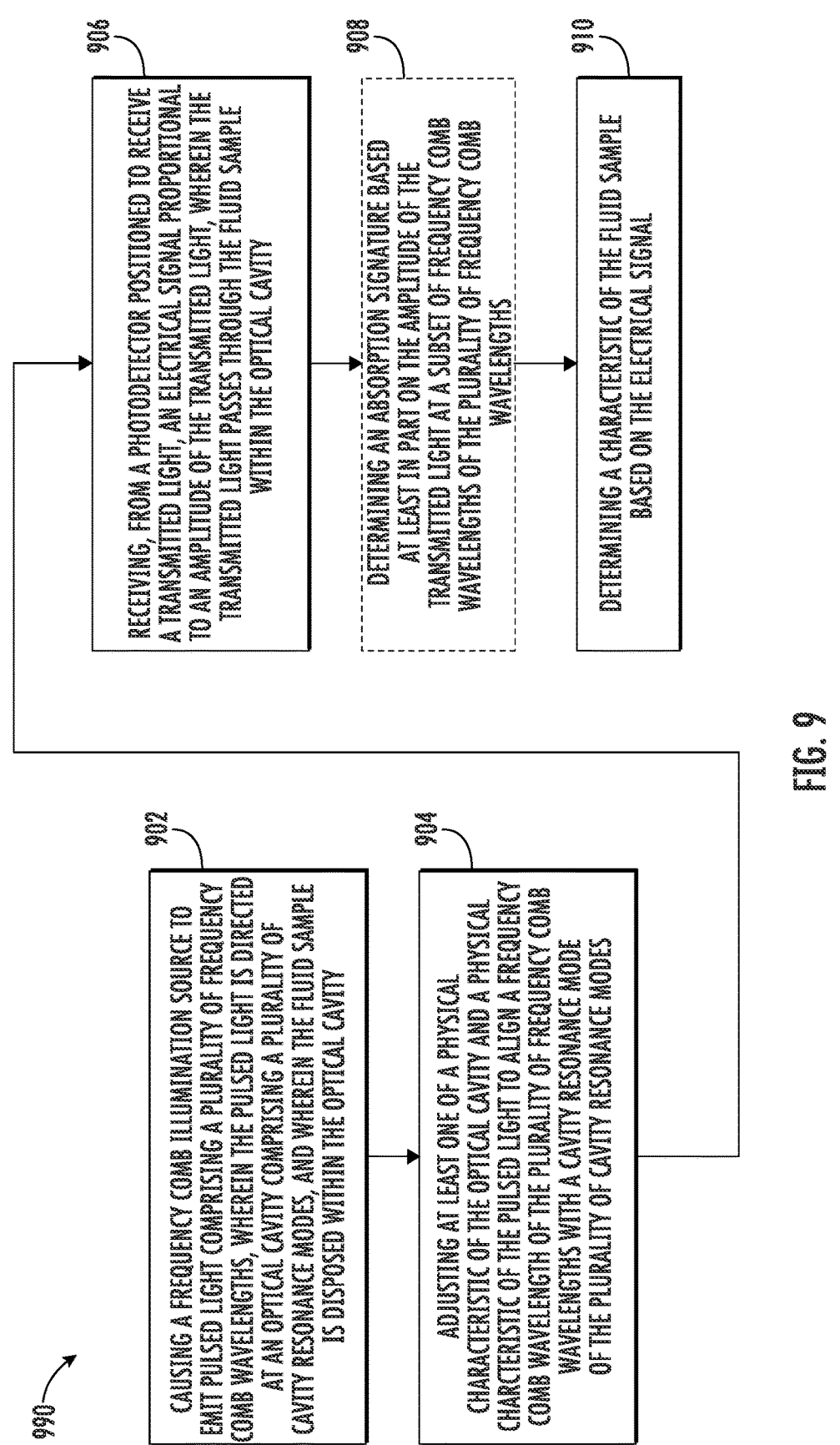

900

902

CAUSING A FREQUENCY COMB ILLUMINATION SOURCE TO EMIT PULSED LIGHT COMPRISING A PLURALITY OF FREQUENCY COMB WAVELENGTHS, WHEREIN THE PULSED LIGHT IS DIRECTED AT AN OPTICAL CAVITY COMPRISING A PLURALITY OF CAVITY RESONANCE MODES, AND WHEREIN THE FLUID SAMPLE IS DISPOSED WITHIN THE OPTICAL CAVITY

904

ADJUSTING AT LEAST ONE OF A PHYSICAL CHARACTERISTIC OF THE OPTICAL CAVITY AND A PHYSICAL CHARACTERISTIC OF THE PULSED LIGHT TO ALIGN A FREQUENCY COMB WAVELENGTH OF THE PLURALITY OF FREQUENCY COMB WAVELENGTHS WITH A CAVITY RESONANCE MODE OF THE PLURALITY OF CAVITY RESONANCE MODES

906

RECEIVING, FROM A PHOTODETECTOR POSITIONED TO RECEIVE A TRANSMITTED LIGHT, AN ELECTRICAL SIGNAL PROPORTIONAL TO AN AMPLITUDE OF THE TRANSMITTED LIGHT, WHEREIN THE TRANSMITTED LIGHT PASSES THROUGH THE FLUID SAMPLE WITHIN THE OPTICAL CAVITY

908

DETERMINING AN ABSORPTION SIGNATURE BASED AT LEAST IN PART ON THE AMPLITUDE OF THE TRANSMITTED LIGHT AT A SUBSET OF FREQUENCY COMB WAVELENGTHS OF THE PLURALITY OF FREQUENCY COMB WAVELENGTHS

910

DETERMINING A CHARACTERISTIC OF THE FLUID SAMPLE BASED ON THE ELECTRICAL SIGNAL

FIG. 9

OPTICAL CAVITY-ENHANCED FREQUENCY COMB SPECTROSCOPY

TECHNOLOGICAL FIELD

Embodiments of the present disclosure relate generally to frequency comb spectroscopy, and more particularly, to the enhancement of frequency comb spectroscopy using optical cavities.

BACKGROUND

Applicant has identified many technical challenges and difficulties associated with determining the composition of gases in a sample fluid. Through applied effort, ingenuity, and innovation, Applicant has solved problems related to the detection of target gases in a sample fluid by developing solutions embodied in the present disclosure, which are described in detail below.

BRIEF SUMMARY

Various embodiments are directed to an example apparatus, method, and system for determining a characteristic related to the composition of a fluid sample. In some embodiments, an example apparatus may comprise a frequency comb illumination source configured to emit pulsed light comprising a plurality of frequency comb wavelengths and an optical cavity comprising a plurality of cavity resonance modes, wherein a fluid sample is disposed within the optical cavity. In some embodiments, a frequency comb wavelength of the plurality of frequency comb wavelengths is configured to align with a cavity resonance mode of the plurality of cavity resonance modes, and a characteristic of the fluid sample is determined based on one or more optical characteristics of a transmitted light passing through the fluid sample within the optical cavity.

In some embodiments, the apparatus further comprises a photodetector positioned to receive the transmitted light, wherein the photodetector is configured to generate an electrical signal proportional to an amplitude of the transmitted light.

In some embodiments, the apparatus further comprises a controller electrically connected to the photodetector, wherein the controller is configured to determine a characteristic of the fluid sample based at least in part on the electrical signal received from the photodetector.

In some embodiments, the controller determines an absorption signature based at least in part on the amplitude of the transmitted light at a subset of frequency comb wavelengths of the plurality of frequency comb wavelengths.

In some embodiments, the characteristic of the fluid sample is determined based at least in part on the absorption signature.

In some embodiments, the characteristic of the fluid sample is a concentration of a target gas.

In some embodiments, the frequency comb illumination source is configured to emit the pulsed light at a pulse repetition rate.

In some embodiments, the pulse repetition rate of the frequency comb illumination source matches a free spectral range of the optical cavity or a multiple thereof.

In some embodiments, the frequency comb illumination source is a dual frequency comb spectroscopy illumination source.

In some embodiments, the optical cavity comprises two or more mirror elements.

In some embodiments, a physical characteristic of the optical cavity is adjusted to modify the plurality of cavity resonance modes, such that one or more comb wavelengths are resonant within the optical cavity.

In some embodiments, the physical characteristic of the optical cavity is at least one of a reflectivity of the two or more mirror elements, an index of refraction of a component within the optical cavity, and an optical cavity length of the transmitted light within the optical cavity.

An example method for determining a characteristic of a target gas in a fluid sample is further provided. In some embodiments, the method comprises causing a frequency comb illumination source to emit pulsed light comprising a plurality of frequency comb wavelengths, wherein the pulsed light is directed at an optical cavity comprising a plurality of cavity resonance modes, and wherein the fluid sample is disposed within the optical cavity. In some embodiments, the method further comprises adjusting at least one of a physical characteristic of the optical cavity and a physical characteristic of the pulsed light to align a frequency comb wavelength of the plurality of frequency comb wavelengths with a cavity resonance mode of the plurality of cavity resonance modes. In some embodiments, the method further comprises receiving, from a photodetector positioned to receive a transmitted light, an electrical signal proportional to an amplitude of the transmitted light, wherein the transmitted light passes through the fluid sample within the optical cavity. In some embodiments, the method further comprises determining a characteristic of the fluid sample based on the electrical signal.

In some embodiments, the method further comprises determining an absorption signature based at least in part on the amplitude of the transmitted light at a subset of frequency comb wavelengths of the plurality of frequency comb wavelengths.

In some embodiments, the method further comprises determining the characteristic of the fluid sample based at least in part on the absorption signature.

In some embodiments, the characteristic of the fluid sample is a concentration of a target gas.

In some embodiments, the frequency comb illumination source is configured to emit the pulsed light at a pulse repetition rate, and the pulse repetition rate of the frequency comb illumination source matches a free spectral range of the optical cavity or a multiple thereof.

In some embodiments, the frequency comb illumination source is a dual frequency comb spectroscopy illumination source.

In some embodiments, the method further comprises adjusting a physical characteristic of the optical cavity to modify the plurality of cavity resonance modes, such that one or more comb wavelengths are resonant within the optical cavity.

An example system for determining a concentration of a target gas within a fluid sample is further provided. In some embodiments, the system comprises a fluid sample intake, configured to receive the fluid sample into a fluid sample chamber. The example system further comprises an optical cavity comprising a plurality of cavity resonance modes, wherein a portion of the fluid sample chamber is within the optical cavity. The example system further comprises a frequency comb illumination source configured to emit pulsed light comprising a plurality of frequency comb wavelengths. The example system further comprises a photodetector positioned to receive transmitted light passing through the portion of the fluid sample chamber within the optical cavity, wherein the photodetector is configured to generate an electrical signal proportional to an amplitude of the transmitted light. The example system further comprises a controller electrically connected to the photodetector, wherein a frequency comb wavelength of the plurality of frequency comb wavelengths is configured to align with a cavity resonance mode of the plurality of cavity resonance modes, and wherein the controller is configured to determine the concentration of the target gas within the fluid sample based on the electrical signal received from the photodetector.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 9 depicts a flowchart of an example method for determining a characteristic of a fluid sample in accordance with an example embodiment of the present disclosure.

DETAILED DESCRIPTION

Figure 1:
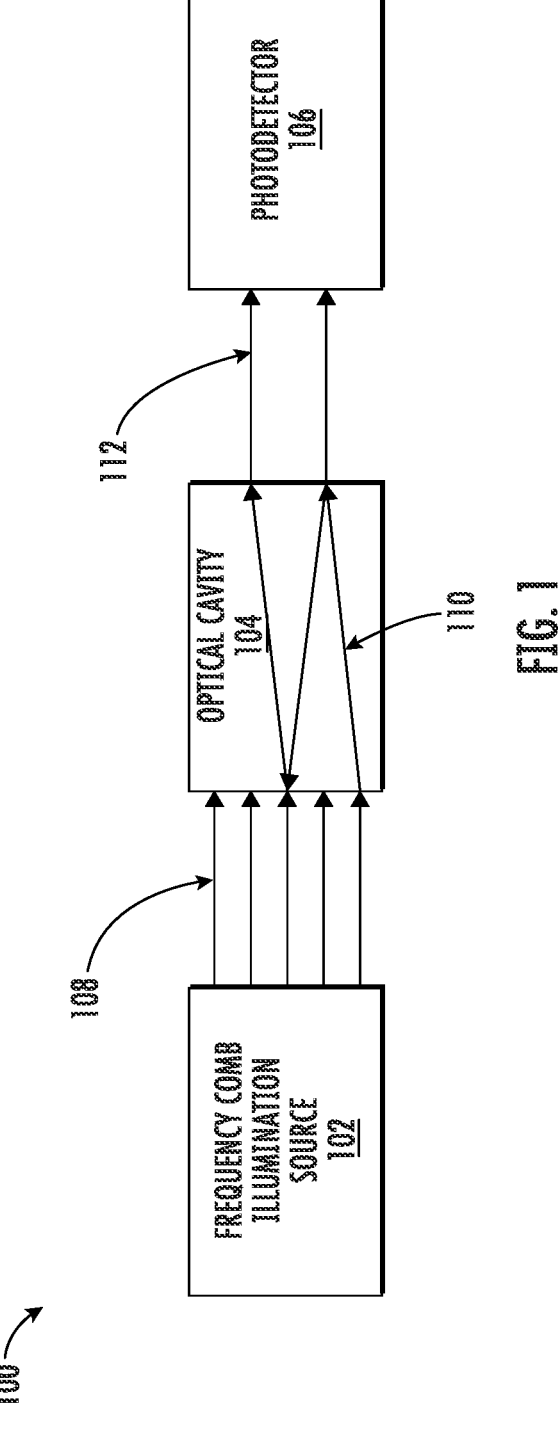
FIG. 1 illustrates an example block diagram of an example optical cavity-enhanced frequency comb spectrometer in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

The term "electrically connected," "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from one of these components.

Various example embodiments address technical problems associated with determining the physical composition of a fluid sample using spectroscopic methods, for example, determining the concentration of a target gas. As understood by those of skill in the field to which the present disclosure pertains, there are numerous example scenarios in which determining the concentration of a target gas and other physical characteristics related to the composition of a fluid sample may be beneficial.

Spectroscopic analysis of a fluid sample may be used to determine one or more components within the fluid sample by illuminating the fluid sample with specific wavelengths of light and monitoring the absorption of light over an optical path length. Each component of the fluid sample (atomic or molecular) has a unique absorption signature that may be used to identify the presence and/or concentration of the component within the fluid sample, or in some embodiments, the absence of a specific target gas (e.g., a leaked toxic gas) in the fluid sample. For example, the concentration of methane or carbon dioxide may be measured by illuminating the fluid sample with varying wavelengths of light and analyzing the absorption signature across the various wavelengths.

Detecting and/or determining the concentration of a target gas in a sample fluid may have many applications in a wide variety of industries. The health industry may determine the concentrations of various target gases in the exhaled breath of a patient. Exhaled breath contains numerous low-concentration gases that may indicate the metabolic status of a patient and other health conditions. For example, elevated levels of acetone in the exhaled breath of a patient may be an indicator of improper operation of the kidneys. In such health applications, it may not be feasible to utilize a device with a long free-space optical path length. A much smaller configuration may be needed to enable point-of-care and/or laboratory analysis of the exhaled breath of a patient. In addition, many industries may determine the concentration of target gases in a sample fluid to preemptively detect hazardous conditions. For example, the presence of certain gases may be dangerous to the health of workers and/or create a hazardous work environment.

Many of these target gases are present in low concentrations (parts per million or parts per billion). In general, when utilizing active-illumination spectroscopy to detect and determine concentrations of low concentration gases, long optical path lengths are required. An optical path is the distance emitted light travels between the illumination source and a receiver, such as a receiving photodetector. Long optical path lengths (e.g., greater than a meter) may generate sufficient absorption of the light emitted from an illumination source to be measured at a receiving photodetector. For some applications such as atmospheric analysis or leak detection at industrial plants, long optical path lengths are readily available and are not a significant limiting factor. However, other applications may require shorter optical path lengths, for example, applications in confined spaces, mobile applications, and/or applications nearby targets of interest. In such applications, optical path lengths may be insufficient to detect target gases in low concentrations.

The various example embodiments described herein utilize various techniques to determine characteristics of a fluid sample utilizing a frequency comb illumination source and an optical cavity to achieve signal enhancement. For example, instead of free-space propagation of the pulsed light emitted from the frequency comb illumination source through a long optical path, the pulsed light of one or more example embodiments described herein is injected into an optical cavity. Non-limiting examples of optical cavities may include a Fabry-Perot interferometer, a multi-mirror ring cavity, a whispering gallery optical cavity, or other similar optical cavity. The reflected light in the optical cavity may pass through the cavity multiple times. The resonant wavelengths of reflected light matching a resonance mode of the optical cavity may be selectively absorbed by the various components of the fluid sample. The approximate number of roundtrip passes the reflected light makes through the optical cavity acts as a multiplying factor for the absorption. Therefore, the absorption of various wavelengths of the pulsed light from the frequency comb illumination source may be detected at a receiving photodetector, even when the concentration of the target gas is low (e.g., parts per million or parts per billion). The presence and/or concentration of the target gas may be determined based on the optical characteristics of the transmitted light received at the receiving photodetector.

In some embodiments, various aspects of the optical cavity and the transmitted light may be varied such that one or more frequency comb wavelengths generated by the frequency comb illumination source may align with one or more cavity resonance modes of the optical cavity. By aligning one or more frequency comb wavelengths with an optical cavity mode, the frequency comb wavelength of the pulsed light may be reflected in the optical cavity containing the fluid sample, increasing the overall optical path of the transmitted light.

In some embodiments, alignment of a frequency comb wavelength may be accomplished by adjusting one or more physical characteristics of the pulsed light emitted from the frequency comb illumination source. Physical characteristics may include the pulse repetition rate, the frequency of the pulsed light, and other similar characteristics. In some embodiments, a dual frequency comb illumination source may be utilized as a frequency comb illumination source. A dual comb frequency illumination source may enable further adjustment of the frequency comb wavelengths to align with the cavity resonance modes.

In some embodiments, the physical characteristics of the optical cavity may be adjusted to align the frequency comb wavelength with the cavity resonance modes. For example, the physical layout of the mirror elements of the optical cavity may be adjusted. In addition, the reflectivity of the mirror elements and/or the index of refraction of one or more components within the optical cavity may be adjusted to tune the cavity resonance modes of the optical cavity. Further, the length or distance between mirror elements may be adjusted to facilitate the alignment of the frequency comb wavelengths with the cavity resonance modes.

As a result of the herein described example embodiments and in some examples, the effectiveness of target gas detection devices using active-illumination spectroscopy may be greatly improved. In addition, the concepts described herein may enable the detection of target gases at low concentration levels within limited physical space constraints.

Referring now to FIG. 1, an example optical cavity-enhanced frequency comb spectrometer 100 is provided. As depicted in FIG. 1, the example optical cavity-enhanced frequency comb spectrometer 100 includes an optical cavity 104 configured to receive pulsed light 108 from a frequency comb illumination source 102. The pulsed light 108 is reflected within the optical cavity 104 as reflected light 110. An unabsorbed portion of the light exits the optical cavity 104 as transmitted light 112 and is received by a photodetector 106.

As depicted in FIG. 1, the example optical cavity-enhanced frequency comb spectrometer 100 includes a frequency comb illumination source 102. A frequency comb illumination source 102 is any illumination source configured to generate pulsed light 108 at a plurality of frequency comb wavelengths uniformly spaced according to the pulse repetition rate of the frequency comb illumination source 102. A frequency comb illumination source 102 may comprise periodic modulation of a continuous-wave laser, four-wave mixing in nonlinear media, stabilization a pulse train generated by a mode-locked laser, or other similar mechanism to generate uniformly spaced pulsed light 108.

As further depicted in FIG. 1, pulsed light 108 is generated by the frequency comb illumination source 102. Pulsed light 108 is any infrared, visible, or ultraviolet collection of photons emitted by the frequency comb illumination source 102 at a uniform pulse repetition rate. The pulse repetition rate is the time between individual pulses emitted by the frequency comb illumination source 102. The pulsed light 108 includes a number of optical characteristics, including the amplitude of the pulsed light 108, the frequency of the pulsed light 108, the polarization of the pulsed light 108, the phase of the pulsed light 108, and other similar optical characteristics.

As depicted in FIG. 1, the pulsed light 108 is directed by the frequency comb illumination source 102 toward an optical cavity 104. An optical cavity 104 is any arrangement of mirror elements that forms a resonating cavity for light waves. The pulsed light 108 enters into the optical cavity 104 by passing through one or more mirror elements of the optical cavity 104. Optical cavities 104 are configured to circulate and/or reflect light (e.g., reflected light 110) within a confined region (e.g., fluid sample chamber). In some embodiments, the optical cavity 104 configuration may comprise a Fabry-Perot interferometer, a confocal Fabry-Perot interferometer, a ring cavity, a whispering gallery mode cavity, or another similar optical cavity configuration.

An optical cavity 104 exhibits one or more cavity resonance modes. Reflected light 110 confined in an optical cavity 104 may reflect multiple times in the mirror elements. Certain frequencies of pulsed light 108 will be sustained by the optical cavity 104 while other frequencies of pulsed light 108 experience destructive interference. The frequencies of light sustained by the optical cavity 104 represent the cavity resonance modes. The resonance modes of an optical cavity 104 may be dependent on a number of physical characteristics of the optical cavity 104. For example, optical properties of the mirror elements may affect the resonance modes of an optical cavity 104. These optical properties may include the reflectivity of the mirror elements, the index of refraction of a component within the optical cavity 104, and other similar properties. The resonance modes of an optical cavity 104 may also be dependent on the physical layout of the optical cavity 104. The physical layout may include the shape, spacing, and number of mirror elements. The physical layout may further include the optical path length, or the length the reflected light 110 travels within the optical cavity 104. The optical properties of the mirror elements and the physical layout of the optical cavity 104 may be adjusted to alter the cavity resonance modes of the optical cavity 104.

A portion of the reflected light 110 may exit the optical cavity 104 toward a photodetector 106 as transmitted light 112. In some embodiments, the optical characteristics of the transmitted light 112 may be changed compared to the pulsed light 108. Optical characteristics of the transmitted light 112 may include the amplitude, the frequency, the polarization, the phase, and other similar optical characteristics of the transmitted light. For example, in some embodiments, the reflected light 110 may be reflected, refracted, distorted, absorbed, or otherwise altered while reflecting in the optical cavity 104. An optical cavity-enhanced frequency comb spectrometer 100 may determine certain characteristics of a fluid sample contained within the optical cavity 104 based on changes to the optical characteristics of the transmitted light 112.

As further depicted in FIG. 1, the example optical cavity-enhanced frequency comb spectrometer 100 includes a photodetector 106. A photodetector 106 may be any set of one or more photodiodes, integrated circuits, devices, sensors, light sensing diodes, or other structures that produce an electric signal proportional to the intensity of light received at the photodetector 106. For example, the electric signal output by the photodetector 106 may increase as the number of photons that strike the photodetector 106 per second increases. In such an embodiment, the electric current output from the photodetector 106 may be used to determine the intensity or amplitude of the light (e.g., transmitted light 112) striking the photodetector 106. In some embodiments, the photodetector 106 may be a light sensitive semiconductor diode that creates an electron-hole pair at the p-n junction when a photon of sufficient energy strikes the photodetector 106.

Figure 2:
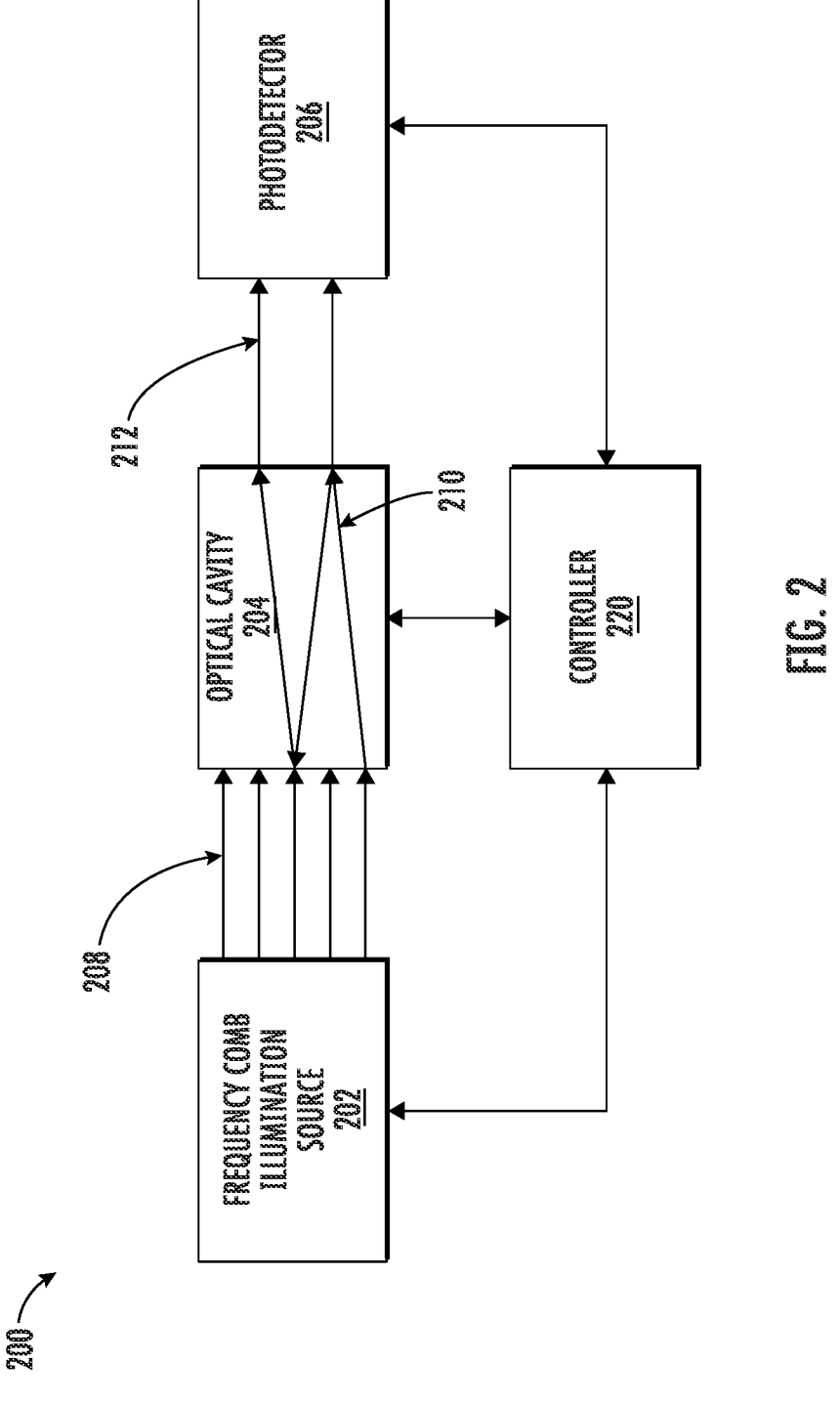
FIG. 2 illustrates an example block diagram of an example optical cavity-enhanced frequency comb spectrometer including a controller in accordance with an example embodiment of the present disclosure.

Referring now to FIG. 2, an example optical cavity-enhanced frequency comb spectrometer 200 is provided. As depicted in FIG. 2, the example optical cavity-enhanced frequency comb spectrometer 200 includes an optical cavity 204 configured to receive pulsed light 208 from a frequency comb illumination source 202. The pulsed light 208 is reflected within the optical cavity 204 as reflected light 210. An unabsorbed portion of the light exits the optical cavity 204 as transmitted light 212 and is received by a photodetector 206. As further depicted in FIG. 2, the example optical cavity-enhanced frequency comb spectrometer 200 includes a controller 220 electrically connected to the frequency comb illumination source 202, the optical cavity 204, and the photodetector 206.

As depicted in FIG. 2, the example optical cavity-enhanced frequency comb spectrometer 200 includes a controller 220. A controller 220 is any computing device electrically connected to the frequency comb illumination source 202, the optical cavity 204, and the photodetector 206, and configured to transmit and receive control/status messages.

Control/status messages exchanged with the frequency comb illumination source 202 may include electrical signals configured to control the frequency and/or wavelength of the pulsed light 208 generated by the frequency comb illumination source 202. Command messages may further control the pulse repetition rate of the frequency comb illumination source 202. By controlling the pulse repetition rate of the frequency comb illumination source 202 may adjust the spacing between the plurality of frequency comb wavelengths. The controller 220 may adjust the frequency comb wavelengths of the frequency comb illumination source 202 to align the frequency comb wavelengths with the cavity resonance modes of the optical cavity 204. Adjusting the frequency comb wavelengths of the frequency comb illumination source 202 is discussed further in relation to FIG. 7.

Control/status messages exchanged with the optical cavity 204 may include electrical signals configured to control position, spacing, and/or angles of the mirror elements. In some embodiments, one or more mirror elements of the optical cavity 204 may be adjusted via control messages. By controlling the mirror elements of the optical cavity 204, the cavity resonance modes may be changed. The controller 220 may adjust the physical characteristics of the optical cavity 204 to align the cavity resonance modes with the frequency comb wavelengths of the frequency comb illumination source 202. Adjusting the cavity resonance modes of the optical cavity 204 is discussed further in relation to FIG. 5.

Control/status messages exchanged with the photodetector 206 may include the receipt of an electrical signal representing the intensity of transmitted light 212 received at the photodetector 206. In addition, the controller 220 may be configured to control parameters of the photodetector 206, such as the sampling rate, the spectral responsivity, the response time, and other similar parameters. The controller 220 may determine optical characteristics of the transmitted light 212 based on the received electrical signal, such as the frequency and intensity of the received transmitted light 212. The optical characteristics may be used to determine the presence, absence, and/or concentration of one or more gases within the optical cavity 204. For example, the controller 220 may determine an absorption signature based on the intensity of the transmitted light 212 received at the photodetector 206 and utilize the absorption signature to determine the composition of the fluid sample in the optical cavity 204. Utilizing the absorption signature to determine the composition of the fluid sample in the optical cavity 204 is discussed further in relation to FIG. 8.

Figure 3:
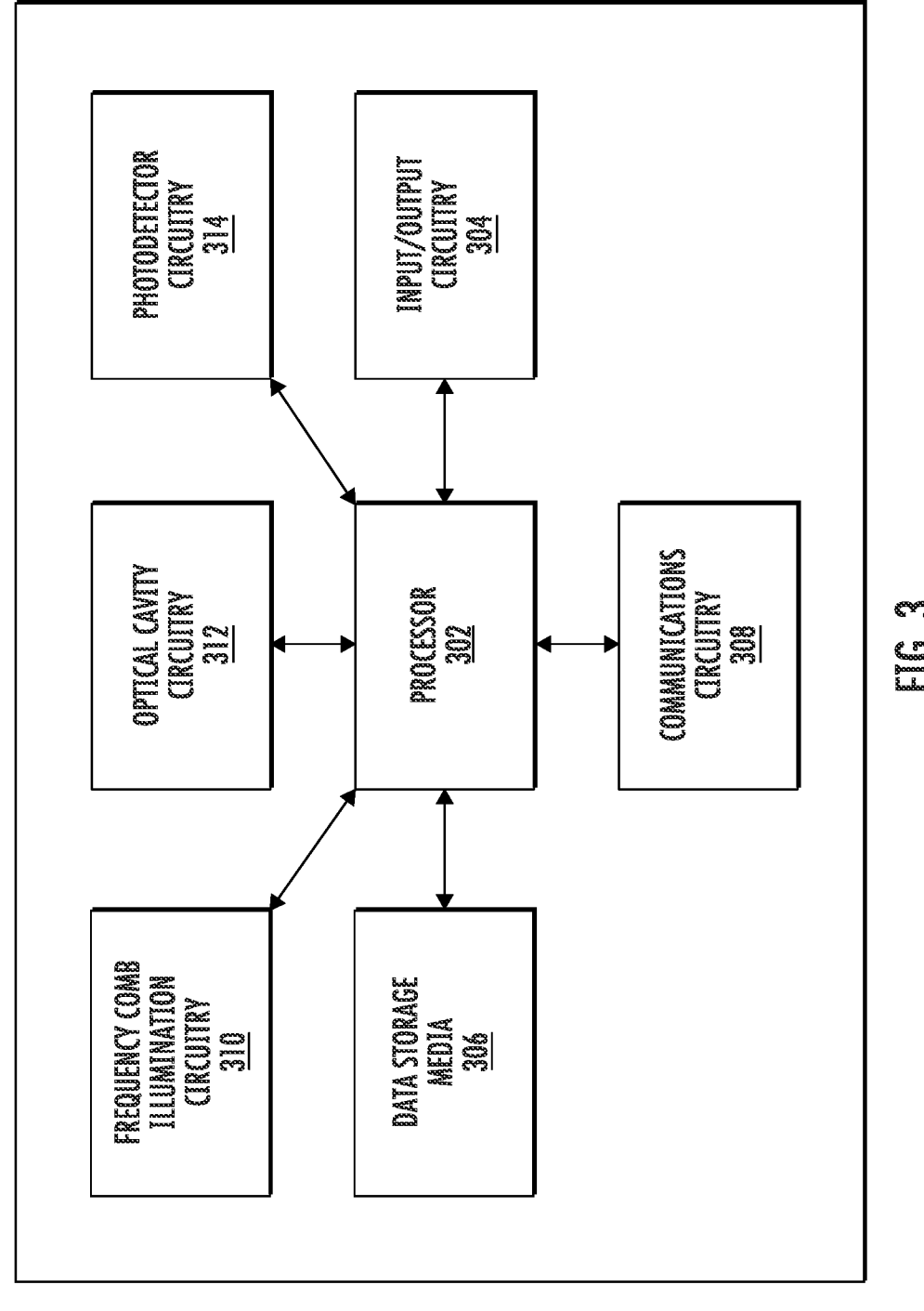
FIG. 3 illustrates an example block diagram of an example controller in accordance with an example embodiment of the present disclosure.

A controller 220 may be embodied by one or more computing systems such as apparatus 300 shown in FIG. 3. The apparatus 300 includes processor 302, input/output circuitry 304, data storage media 306, communications circuitry 308, frequency comb illumination circuitry 310, optical cavity circuitry 312, and photodetector circuitry 314. In some embodiments, the apparatus 300 is configured, using one or more of the sets of circuitry 302, 304, 306, 308, 310, 312, and/or 314, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the apparatus 300 provide or supplement the functionality of other particular sets of circuitry. For example, the processor 302 in some embodiments provides processing functionality to any of the sets of circuitry, the data storage media 306 provides storage functionality to any of the sets of circuitry, the communications circuitry 308 provides network interface functionality to any of the sets of circuitry, and/or the like.

In some embodiments, the processor 302 (and/or co-processor or any other processing circuitry assisting or otherwise associated with the processor) is/are in communication with the data storage media 306 via a bus for passing information among components of the apparatus 300. In some embodiments, for example, the data storage media 306 is non-transitory and may include, for example, one or more volatile and/or non-volatile memories. In other words, for example, the data storage media 306 in some embodiments includes or embodies an electronic storage device (e.g., a computer readable storage medium). In some embodiments, the data storage media 306 is configured to store information, data, content, applications, instructions, or the like, for enabling the apparatus 300 to carry out various functions in accordance with example embodiments of the present disclosure.

The processor 302 may be embodied in a number of different ways. For example, in some example embodiments, the processor 302 includes one or more processing devices configured to perform independently. Additionally, or alternatively, in some embodiments, the processor 302 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 300, and/or one or more remote or "cloud" processor(s) external to the apparatus 300.

In an example embodiment, the processor 302 is configured to execute instructions stored in the data storage media 306 or otherwise accessible to the processor. Alternatively, or additionally, the processor 302 in some embodiments is configured to execute hard-coded functionality. As such, whether configured by hardware or software methods, or by a combination thereof, the processor 302 represents an entity (e.g., physically embodied in circuitry) capable of performing operations according to an embodiment of the present disclosure while configured accordingly. Alternatively, or additionally, as another example in some example embodiments, when the processor 302 is embodied as an executor of software instructions, the instructions specifically configure the processor 302 to perform the algorithms embodied in the specific operations described herein when such instructions are executed.

In some embodiments, the apparatus 300 includes input/output circuitry 304 that provides output to the user and, in some embodiments, to receive an indication of a user input. In some embodiments, the input/output circuitry 304 is in communication with the processor 302 to provide such functionality. The input/output circuitry 304 may comprise one or more user interface(s) (e.g., user interface) and in some embodiments includes a display that comprises the interface(s) rendered as a web user interface, an application user interface, a user device, a backend system, or the like. The processor 302 and/or input/output circuitry 304 comprising the processor may be configured to control one or more functions of one or more user interface elements through computer program instructions (e.g., software and/or firmware) stored on a memory accessible to the processor (e.g., data storage media 306, and/or the like). In some embodiments, the input/output circuitry 304 includes or utilizes a user-facing application to provide input/output functionality to a client device and/or other display associated with a user.

In some embodiments, the apparatus 300 includes communications circuitry 308. The communications circuitry 308 includes any means such as a device or circuitry embodied in either hardware or a combination of hardware and software that is configured to receive and/or transmit data from/to a network and/or any other device, circuitry, or module in communication with the apparatus 300. In this regard, the communications circuitry 308 includes, for example in some embodiments, a network interface for enabling communications with a wired or wireless communications network. Additionally, or alternatively in some embodiments, the communications circuitry 308 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 308 includes circuitry for interacting with the antenna(s) and/or other hardware or software to cause transmission of signals via the antenna(s) or to handle receipt of signals received via the antenna(s). In some embodiments, the communications circuitry 308 enables transmission to and/or receipt of data from a client device in communication with the apparatus 300.

The frequency comb illumination circuitry 310 includes hardware, software, firmware, and/or a combination thereof, that supports various functionality associated with configuring a frequency comb illumination source (e.g., frequency comb illumination source 102, frequency comb illumination source 202). For example, in some embodiments, the frequency comb illumination circuitry 310 includes hardware, software, firmware, and/or a combination thereof to transmit and receive control/status messages adjusting the plurality of frequency comb wavelengths of the frequency comb illumination source.

The optical cavity circuitry 312 includes hardware, software, firmware, and/or a combination thereof, that supports various functionality associated with configuring an optical cavity (e.g., optical cavity 104, optical cavity 204). For example, in some embodiments, the optical cavity circuitry 312 includes hardware, software, firmware, and/or a combination thereof to transmit and receive control/status messages controlling the physical characteristics of the optical cavity.

The photodetector circuitry 314 includes hardware, software, firmware, and/or a combination thereof, that supports various functionality associated with configuring a photodetector (e.g., photodetector 106, photodetector 206). For example, in some embodiments, the photodetector circuitry 314 includes hardware, software, firmware, and/or a combination thereof to transmit and receive control/status messages controlling the operation of the photodetector. In addition, the photodetector circuitry 314 includes hardware, software, firmware, and/or a combination thereof to receive electrical signals from the photodetector representing the intensity of transmitted light (e.g., transmitted light 112, transmitted light 212) received at the photodetector.

Additionally, or alternatively, in some embodiments, one or more of the sets of circuitry 302-314 are combinable. Additionally, or alternatively, in some embodiments, one or more of the sets of circuitry perform some or all of the functionality described associated with another component. For example, in some embodiments, one or more sets of circuitry 302-314 are combined into a single module embodied in hardware, software, firmware, and/or a combination thereof. Similarly, in some embodiments, one or more of the sets of circuitry, for example frequency comb illumination circuitry 310, optical cavity circuitry 312, and/or photodetector circuitry 314, is/are combined such that the processor 302 performs one or more of the operations described above with respect to each of these circuitry individually.

Figure 4:
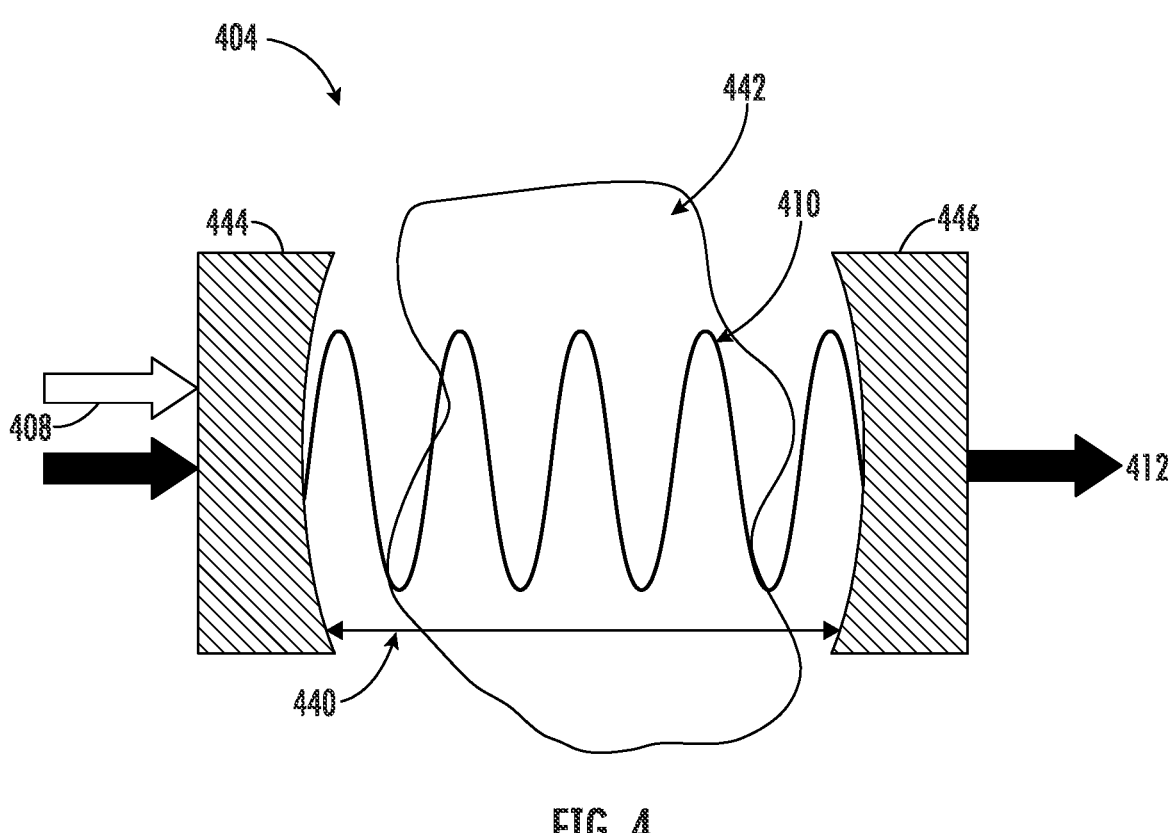
FIG. 4 illustrates an example optical cavity in accordance with an example embodiment of the present disclosure.

Referring now to FIG. 4, an example embodiment of an optical cavity 404 is provided. As depicted in FIG. 4, the example optical cavity 404 includes a first confocal mirror element 444 and a second confocal mirror element 446 separated by an optical cavity length 440 and defining a confined region 448. A fluid sample 442 is dispensed within the confined region 448 such that the reflected light 410 entering the cavity from generated pulsed light 408 interacts with the fluid sample 442 within the optical cavity 404. Transmitted light 412 exits the optical cavity 404 through a partially reflective mirror element 446 to be received by a photodetector.

As depicted in FIG. 4, the example optical cavity 404 includes a pair of mirror elements 444, 446. The mirror elements 444, 446 are any reflective or partially reflective elements that enable the circulation of light within the confined region 448 of the optical cavity 404. Although the depicted mirror elements are arranged in a confocal Fabry-Perot interferometer arrangement, the mirror elements may be arranged in any optical cavity configuration enabling the reflected light 410 to pass through the confined region 448 a plurality of times before exiting the optical cavity 404. For example, the mirror elements 444, 446 may be arranged in a Fabry-Perot interferometer configuration, a confocal Fabry-Perot interferometer arrangement, a ring cavity, a whispering gallery circular cavity, or other similar optical cavity configuration. The mirror elements 444, 446 further comprise at least a portion of partially reflective mirror, through which the reflected light 410 may pass as transmitted light 412.

As further depicted in FIG. 4, the mirror elements 444, 446 are separated by an optical cavity length 440. The optical cavity length 440 may be inversely proportional to the free spectral range of the cavity resonance modes, as described further in relation to FIG. 5. The optical cavity length 440 may further define the optical path length of the reflected light 410. The optical path length is the total distance the reflected light traverses while in the confined region 448 of the optical cavity 404. The optical path length is generally related to the specific configurations and characteristics of the optical cavity and is closely related to the finesse and quality of the optical cavities. As a non-limiting example, in some embodiments, the optical path length may be characterized by the equation:

$$OPL = \frac{L}{(1-R)}$$

where OPL is the optical path length, L is the optical cavity length, and R is the mirror reflectance.

Figure 5:
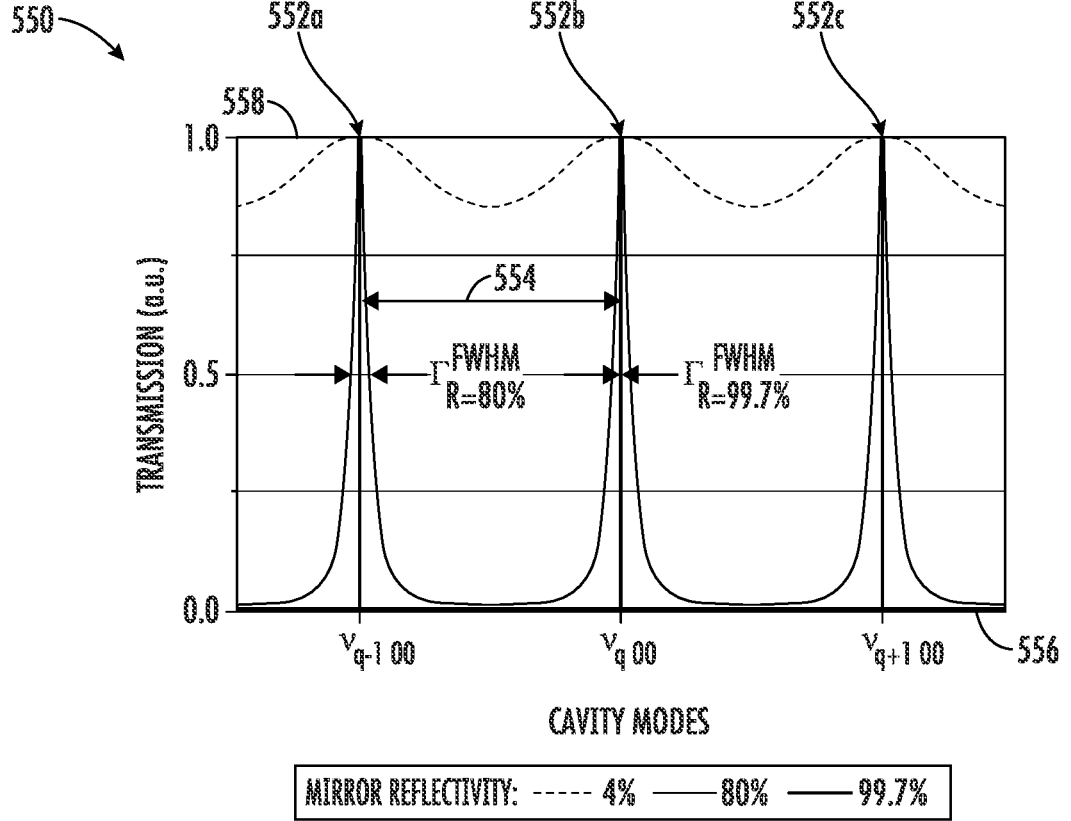
FIG. 5 illustrates a graph of example optical cavity resonance modes in accordance with an example embodiment of the present disclosure.

Thus, in an instance in which the optical cavity length is 50 centimeters and the mirror reflectance is 0.99, the optical path length would be 5000 centimeters. The optical path length at one of the cavity resonance modes is 100 times greater than the optical cavity length alone. This increase in optical cavity length may be obtained in a confined space (e.g., 50 centimeters) and leads to increased accuracy in detecting gases with low concentrations general only available at greater optical cavity lengths. As depicted in FIG. 5, in a confocal Fabry-Perot interferometer configuration, the radius of the confocal mirror elements 444, 446 is equal to the optical cavity length 440.

In some embodiments, the mirror elements 444, 446 may be adjustable. Adjusting the mirror elements 444, 446 may increase the optical cavity length 440 and/or the optical path length. Adjusting the mirror elements 444, 446 may additionally change the cavity resonance modes of the optical cavity 404. In some embodiments, a controller (e.g., controller 220) may adjust the mirror elements 444, 446 to align the cavity resonance modes with the frequency comb wavelengths during operation of the optical cavity-enhanced frequency comb spectrometer.

As further depicted in FIG. 4, the optical cavity 404 includes a confined region 448 in which a fluid sample 442 is dispensed. The confined region 448 is any space between the mirror elements (e.g., mirror elements 444, 446) through which the reflected light 410 passes when reflected in the optical cavity. In some embodiments, a fluid sample chamber may be positioned in the confined region 448 of the optical cavity 404. A fluid sample chamber may be configured to contain a fluid sample 442. In some embodiments, the fluid sample chamber may control the inflow and outflow of the fluid sample 442. For example, the fluid sample chamber may include a fluid sample intake configured to receive the fluid sample from an external source, and a fluid sample outlet configured to release the fluid sample from the fluid sample chamber.

As further depicted in FIG. 4, a fluid sample 442 is dispensed in the confined region 448 of the optical cavity 404. A fluid sample 442 is any liquid or gas dispensed within the confined region 448 of the optical cavity 404 for which certain characteristics of the fluid sample 442 are to be determined. An optical cavity-enhanced frequency comb spectrometer (e.g., optical cavity-enhanced frequency comb spectrometer 100, optical cavity-enhanced frequency comb spectrometer 200) may be configured to identify and analyze gases or molecules contained within the fluid sample 442. For example, an optical cavity-enhanced frequency comb spectrometer may be configured to determine the concentration of water vapor ($H_2O$) in a fluid sample 442, and/or and optical cavity-enhanced frequency comb spectrometer may be configured to determine the presence of methane ($CH_4$) in a fluid sample 442.

Characteristics of the fluid sample 442 include any measurement corresponding to the composition of gases comprising the fluid sample 442. For example, a characteristic of the fluid sample 442 may be a concentration of a particular gas in the fluid sample 442, such as water vapor ($H_2O$), Carbon Dioxide ($CO_2$), Oxygen ($O_2$), methane ($CH_4$), or any other gas. Other characteristics may include the presence of a particular gas, such as a toxic, harmful, or flammable gas. In some embodiments, a characteristic of a fluid sample 442 may include the absence of a or in some embodiments, the absence of a specific target gas (e.g., a leaked toxic gas) in the fluid sample 442.

Referring now to FIG. 5, a graph 550 depicting example cavity resonance modes 552a, 552b, 552c of an example optical cavity (e.g., optical cavity 104, 204, 404) separated by a free spectral range 554 is provided. As depicted in FIG. 5, the x-axis 556 of the graph 550 represents the frequency of pulsed light (e.g., pulsed light 108, 208, 408) entering the optical cavity and the y-axis 558 represents the intensity of the reflected light within the optical cavity.

As depicted in graph 550 of FIG. 5, the example optical cavity includes a plurality of cavity resonance modes 552a, 552b, 552c. A cavity resonance modes 552a, 552b, 552c is any frequency of light reflected in the confined region (e.g., confined region 448) of an optical cavity, such that the reflected light (e.g., reflected light 110, 210, 410) within the confined region (e.g., confined region 448) such that the reflected light is sustained within the confined region of the optical cavity due to constructive interference and the intensity of the reflected light experiences a local maximum with regard to a range of frequencies. The cavity resonance modes 552a, 552b, 552c of an optical cavity are equally spaced according to a free spectral range 554. The free spectral range 554 represents the difference in frequency between subsequent cavity resonance modes 552a, 552b, 552c.

As described herein, the frequencies of the cavity resonance modes 552a, 552b, 552c may be affected by a number of physical characteristics of the optical cavity and/or optical characteristics of the transmitted light. For example, the reflectivity of the mirror elements, the index of refraction of a component within the optical cavity, the arrangement of the mirror elements, the optical path length of the reflected light, and other physical characteristics may be adjusted to alter the position and intensity of the cavity resonance modes 552a, 552b, 552c. For example, in some embodiments, the free spectral range 554, defining the spacing between the cavity resonance modes 552a, 552b, 552c may be defined by the equation:

$$\Delta\lambda_{FSR} = \frac{\lambda^2}{nL}$$

where $\Delta\lambda_{FSR}$ is the distance between cavity resonance modes 552a, 552b, 552c in terms of wavelength, $\lambda$ is the wavelength of the pulsed light, n is the index of refraction, and L is the optical path length. Thus, as the optical path length L increases, the distance between the cavity resonance modes 552a, 552b, 552c becomes smaller. As the distance between the cavity resonance modes 552a, 552b, 552c becomes smaller, more frequencies of pulsed light may be transmitted into the optical cavity and provide useful feedback related to the fluid sample (e.g., fluid sample) within the confined region of the optical cavity. The smaller spacing between cavity resonance modes 552a, 552b, 552c further provides greater resolution when determining an absorption signature of the fluid sample.

Figure 6:
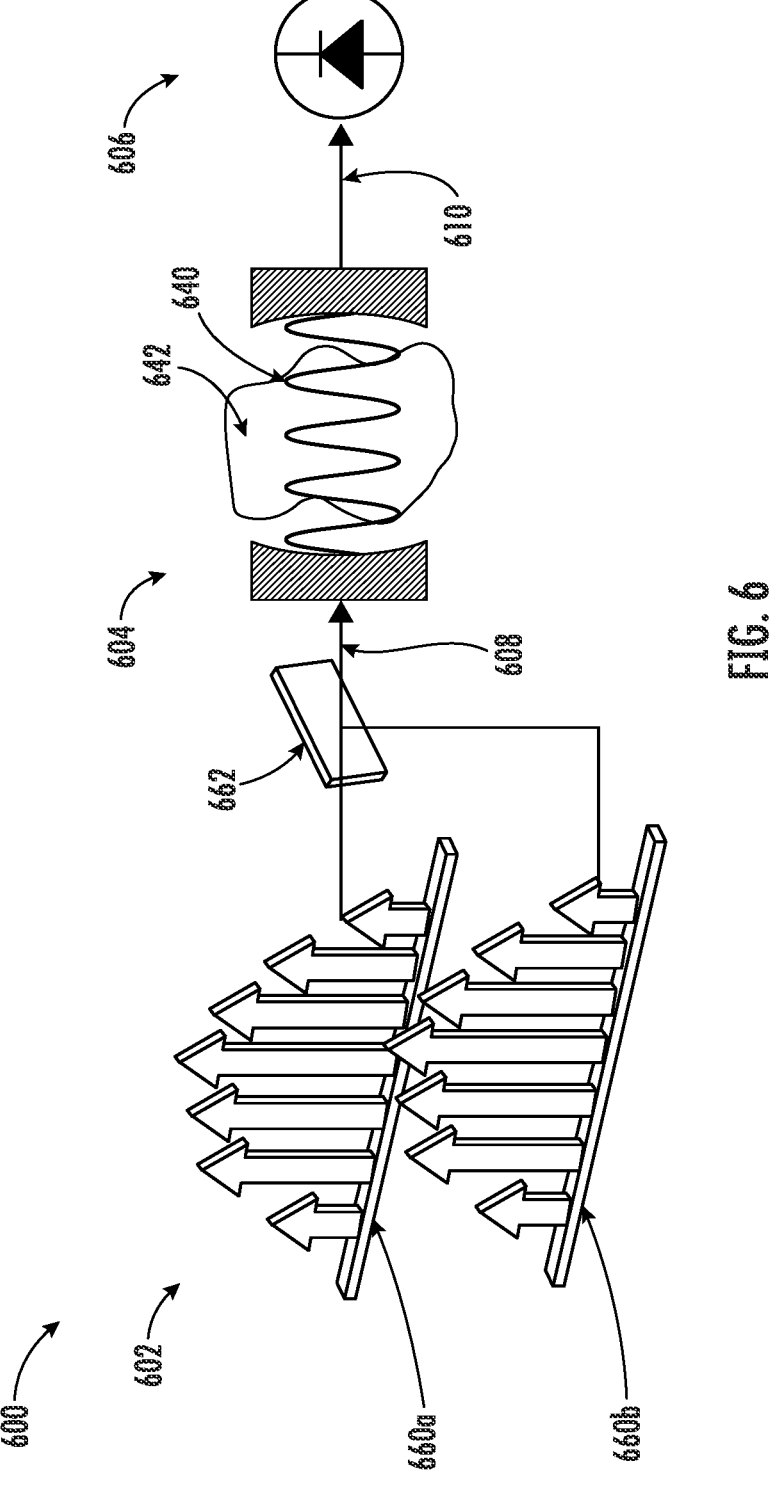
FIG. 6 illustrates an example embodiment of an optical cavity-enhanced frequency comb spectrometer including a dual frequency comb illumination source in accordance with an example embodiment of the present disclosure.

Referring now to FIG. 6, an example optical cavity-enhanced frequency comb spectrometer 600 is provided. As depicted in FIG. 6, the example optical cavity-enhanced frequency comb spectrometer 600 includes a frequency comb illumination source 602 comprising a first frequency comb 660a and a second frequency comb 660b. The emitted light from the frequency combs 660a, 660b is combined using a cube beamsplitter 662 to form a pulsed light 608 signal directed toward an optical cavity 604. The pulsed light 608 propagates within the confined space of the optical cavity 604 as reflected light 610, interacting with a fluid sample 642. At least a portion of the reflected light 610 exits the optical cavity 604 as transmitted light 612 received by a photodetector.

Figure 7:
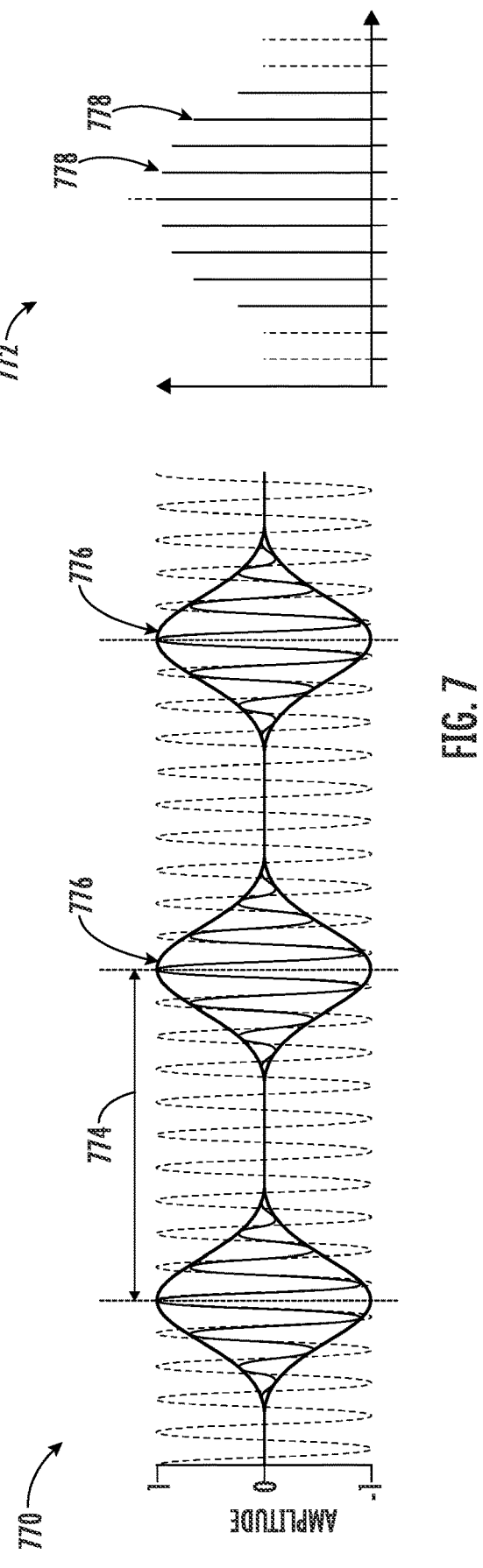
FIG. 7 illustrates an example pulsed light output of a frequency comb illumination source in accordance with an example embodiment of the present disclosure.

As depicted in FIG. 6, the frequency comb illumination source 602 comprises a dual frequency illumination source having a first frequency comb 660a and a second frequency comb 660b. A dual frequency comb illumination source utilizes two frequency combs 660a, 660b each emitting pulses of light at a different pulse repetition rate and thus generating frequency combs differing by an offset related to the difference in frequency between the two pulse repetitions rates. The pulses of light emitted from the two frequency combs 660a, 660b are combined using a cube beamsplitter 662 configured to combine the two optical signals. The result is a single pulsed light 608 signal directed at the optical cavity 604. Although depicted in FIG. 6 as a dual frequency comb illumination source, the frequency comb illumination source 602 may be any source configured to generate pulsed light 608 at a plurality of frequency comb wavelengths uniformly spaced based on the pulse repetition rate of the one or more frequency comb illumination sources. FIG. 7 describes the frequency comb generated by a frequency comb illumination source 602 in further detail.

Referring now to FIG. 7, a time domain graph 770 and a frequency domain graph 772 of an example pulsed signal (e.g., pulsed light 108, 208, 408, 608) are provided. As shown in FIG. 7, the time domain graph 770 includes a plurality of short light pulses 776 separated in time by a pulse repetition rate 774. The frequency domain graph 772 depicts the correlated frequency combs 778 resulting from the plurality of light pulses.

As depicted in FIG. 7, a frequency comb illumination source (e.g., frequency comb illumination source 102, 202, 602) generates a plurality of light pulses 706 at a pulse repetition rate 774. In some embodiments, a frequency comb illumination source may utilize a mode-locked laser to generate short light pulses 776. For example, a frequency comb illumination source may include a laser resonator configured to circulate a single light pulse within the laser resonator. The light pulse may contact an output coupler at a regular interval (e.g., pulse repetition rate 774) and output a light pulse 776 every time the output coupler is contacted. Thus, as depicted in the time domain graph 770, a light pulse 776 is generated according to the pulse repetition rate 774.

As further depicted in the frequency domain graph 772 of FIG. 7, the plurality of light pulses 706 generated at a pulse repetition rate 774 correspond to a plurality of frequency combs 778. Each frequency comb 778 is separated in the frequency domain by the pulse repetition rate 774. The frequencies corresponding to each frequency comb 778 is associated with a different wavelength of light, or in other words, a frequency comb wavelength. Thus, the pulsed light comprises a plurality of frequency comb wavelengths. Upon entering the confined region within the optical cavity, each wavelength of the plurality of frequency comb 778 wavelengths may interact differently with the gases, substances and molecules contained in the fluid sample. For example, some wavelengths of light may be absorbed, refracted, and/or reflected, while other wavelengths of light pass through uninhibited. Based on the absorption level of each of the plurality of frequency comb wavelengths passing through the optical cavity, an absorption signature specific to the fluid sample may be determined.

Figure 8:
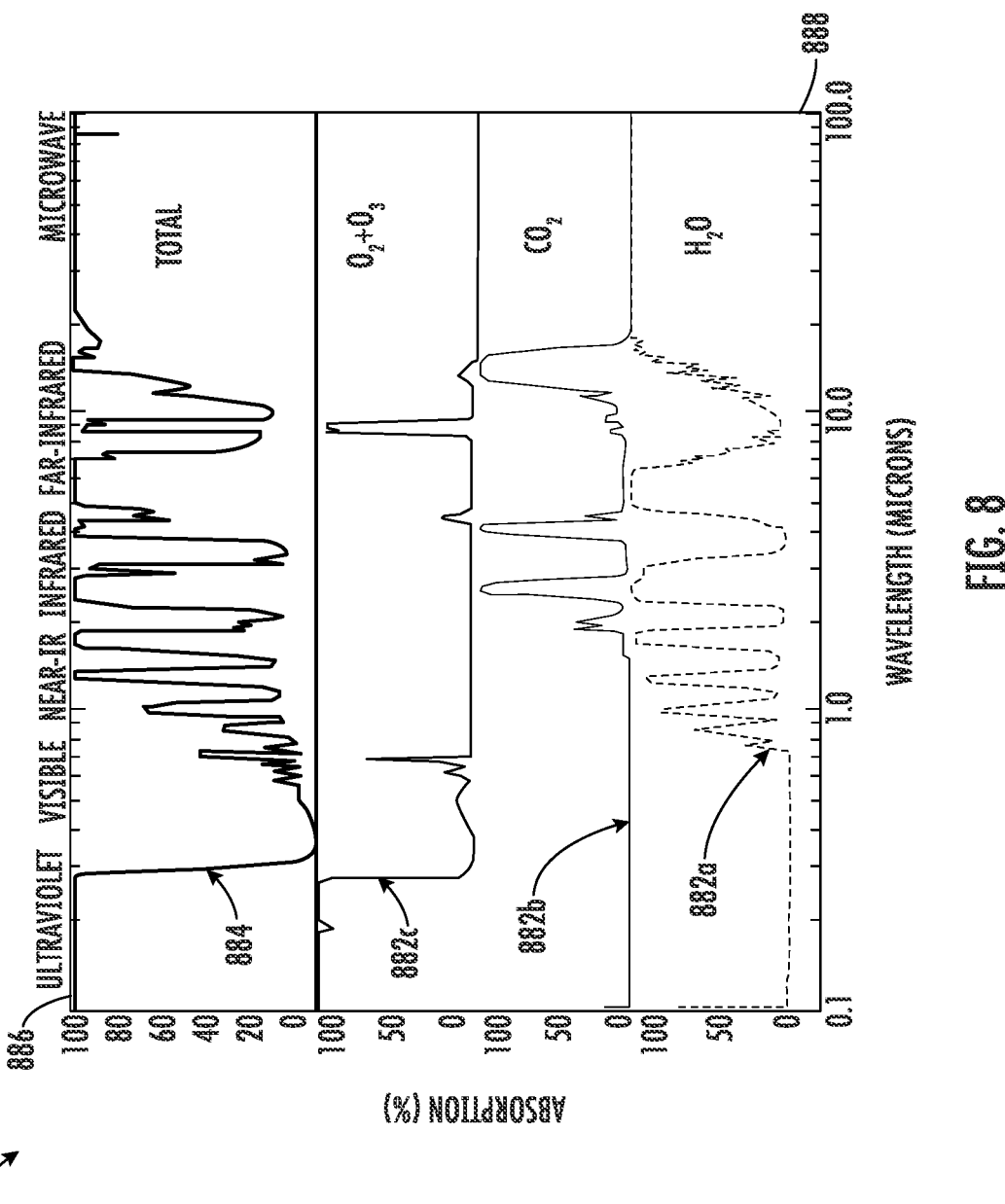
FIG. 8 illustrates example absorption signatures of example target gases in accordance with an example embodiment of the present disclosure.

Referring now to FIG. 8, an example absorption signature graph 880 is depicted. The depicted absorption signature graph 880 indicates the relation of the absorption percentage (depicted on the y-axis 886) to the wavelength of light (depicted on the x-axis 888). As shown in FIG. 8, the absorption signature graph includes three target gas absorption signatures 882a-882c, and an example fluid sample absorption signature 884.

As light (e.g., reflected light 110, 210, 410, 610) passes through a fluid sample (e.g., fluid sample 442, 642) the light reacts differently with the fluid sample depending on the composition of the fluid sample, and the wavelength of the light. For example, infrared light exhibiting a wavelength of 6000 nanometers may pass through fluid samples primary comprising oxygen and/or carbon dioxide almost unaffected. However, the same light (e.g., having a wavelength of 6000 nanometers) may be almost completely absorbed by a fluid sample primarily comprising water vapor. Thus, a fluid sample absorption signature 884 may be determined by recording the percentage of light absorbed by a particular fluid sample across a broad spectrum of wavelengths.

As depicted in FIG. 8, an absorption signature 882a-882d is the variance of absorption of a gas or fluid with respect to a spectrum of wavelengths of light. FIG. 8 depicts the absorption signatures of various sample gases, for example, a water vapor absorption signature 882a, a carbon dioxide absorption signature 882b, and an oxygen absorption signature 882c. The absorption signature 882d of an example fluid sample is further depicted. The absorption signatures 882a-882d indicate the percentage of light absorbed at wavelengths ranging from 0.1 micrometers to 100 micrometers. Absorption signatures may be determined by exposing a fluid to such a spectrum of wavelengths of light and recording the percentage of light absorbed at each of the wavelengths within the spectrum.

Once an absorption signature of a particular target gas has been determined, the presence, absence, and/or concentration of the target gas may be detected in a sample fluid. By transmitting light comprising a plurality of wavelengths across a broad spectrum of wavelengths and receiving the transmitted light with a photodetector (e.g., photodetector 106, 206, 606), the absorbance of the sample fluid at each wavelength may be determined. An absorption signature may be generated by mapping the absorption percentage for each of the transmitted wavelengths. The absorption signature may be utilized to determine one or more characteristics of the fluid sample, for example, the presence, absence, and/or concentration of a target gas, by comparing the recorded absorption signature with known absorption signatures (e.g., absorption signature 882a-882c).

As described herein, by generating a plurality of frequency comb wavelengths of light using a frequency comb illumination source, the absorption percentage of a plurality of frequency comb wavelengths interacting with a fluid sample may be determined simultaneously. In addition, by utilizing an optical cavity, the optical path length of the pulsed light emitted from the frequency comb illumination source may be increased. The increased optical path length enables more accurate detection of low concentrations of target gases within fluid samples. As further described herein, by aligning one or more of the frequency comb wavelengths with one or more of the cavity resonance modes, the pulsed light aligned with the cavity resonance modes may propagate through the sample fluid at an increased optical path length, providing valuable absorption information across a plurality of frequency comb wavelengths simultaneously.

Referring now to FIG. 9, an example process 990 for determining a characteristic of a target gas in a fluid sample is provided. At block 902, a processor (e.g., controller 220) causes a frequency comb illumination source (e.g., frequency comb illumination source 102, 202, 602) to emit pulsed light (e.g., pulsed light 108, 208, 408, 608) comprising a plurality of frequency comb wavelengths, wherein the pulsed light is directed at an optical cavity (e.g., optical cavity 104, 204, 404) comprising a plurality of cavity resonance modes (e.g., cavity resonance modes 552a-552c), and wherein the fluid sample is disposed within the optical cavity. As described herein, the frequency comb illumination may be configured to generate light at a plurality of frequency comb wavelengths uniformly separated based on the pulse repetition rate of the frequency comb illumination source. The frequency comb illumination source is positioned such that the pulsed light is configured to enter into the confined region of the optical cavity.

At block 904, the processor adjusts at least one of a physical characteristic of the optical cavity and a physical characteristic of the pulsed light to align a frequency comb wavelength of the plurality of frequency comb wavelengths with a cavity resonance mode of the plurality of cavity resonance modes. As described herein, physical characteristics of the optical cavity may include the reflectivity of the mirror elements, the index of refraction of one or more components within the optical cavity, the arrangement of the mirror elements, the optical path length of the reflected light, and other similar characteristics. Each of these physical characteristics and others may have an effect on the frequencies of light that experience constructive interference in the optical cavity and comprise the plurality of cavity resonance modes of the optical cavity.

In addition, physical characteristics of the pulsed light may be adjusted to alter the wavelengths of light comprising the plurality of frequency comb wavelengths generated by the frequency comb illumination source. As described herein, physical characteristics of the pulsed light may include the pulse repetition rate, the frequency of the pulsed light, or other similar characteristics. Adjusting the physical characteristics, such as the pulse repetition rate, may affect the free spectral range associated with the wavelengths of light generated by the frequency comb illumination source. One or both of the physical characteristics of the optical cavity and the physical characteristics of the frequency comb illumination source may be adjusted to align at least one of the frequency comb wavelengths with a cavity resonance mode. In some embodiments, a plurality of frequency comb wavelengths may be aligned with a plurality of cavity resonance modes.

At block 906, the controller receives from a photodetector (e.g., photodetector 106, 206, 606) positioned to receive a transmitted light (e.g., transmitted light 112, transmitted light 212, transmitted light 412, transmitted light 612), an electrical signal proportional to an amplitude of the transmitted light, wherein the transmitted light passes through the fluid sample (e.g., fluid sample 442, 642) within the optical cavity. As described herein, pulsed light exhibiting a frequency comb wavelength aligned with a cavity resonance mode may be reflected within the optical cavity. A fluid sample comprising one or more target gases is dispensed in the confined region of the optical cavity, for example, in a fluid sample chamber. As the reflected light is reflected through the fluid sample, different wavelengths of light are absorbed at different rates depending on the composition of the sample fluid. The light exiting the optical cavity is received at a photodetector. The photodetector is configured to transmit an electrical signal proportional to the amplitude or intensity of the transmitted light to the processor.

At block 908, the processor determines an absorption signature (e.g., absorption signature 882d) based at least in part on the amplitude of the transmitted light at a subset of frequency comb wavelengths of the plurality of frequency comb wavelengths. The processor may record the amplitude of transmitted light associated with one or more frequency comb wavelengths of the plurality of frequency comb wavelengths. In some embodiments, the set of frequency comb wavelengths comprising the absorption signature may be based on key features of the absorption signature of a target gas. In some embodiments, the set of frequency comb wavelengths comprising the absorption signature may be based on the alignment of the frequency comb wavelengths with the plurality of cavity resonance modes.

At block 910, the processor determines a characteristic of the fluid sample based on the electrical signal. As described herein, characteristics of the fluid sample may include the presence, absence, and/or concentration of a target gas in the fluid sample. For example, a processor may be configured to detect the presence of methane in a fluid sample. Or, in another example, a processor may be configured to determine the concentration of carbon dioxide in a fluid sample. The processor may utilize the electrical signal and/or the absorption signature to determine characteristics related to the composition of the fluid sample. For example, the processor may determine unique aspects of a target gas, such as particular wavelengths at which the absorption of the target gas is abnormally high or low. The processor may then utilize the unique aspects of the absorption signature to determine the presence, absence, and/or concentration of the target gas.

In some embodiments, further adjustments may be made to the physical characteristics of the optical cavity and/or the physical characteristics of the pulsed light to determine the absorption of the fluid sample at a broader range of wavelengths. For example, the optical cavity may be used to determine the absorption signature at one or more frequency comb wavelengths, then the optical cavity parameters and/or the frequency comb wavelengths may be shifted to probe a new set of wavelengths.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. For example, one skilled in the art may recognize that such principles may be applied to breathalyzers, safety detection systems, atmospheric analysis tools, and so on. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:
a frequency comb illumination source configured to emit pulsed light comprising a plurality of frequency comb wavelengths; and
an optical cavity operable in a plurality of cavity resonance modes, wherein the optical cavity is configured in at least one cavity resonance mode of the plurality of cavity resonance modes,
wherein a fluid sample is disposed within the optical cavity;
wherein the plurality of frequency comb wavelengths of the frequency comb illumination source are modified, based on the at least one configured cavity resonance mode of the optical cavity, to align the frequency comb wavelengths of the pulsed light with the at least one configured cavity resonance mode of the optical cavity, and
wherein a characteristic of the fluid sample is determined based on one or more optical characteristics of a transmitted light passing through the fluid sample within the optical cavity.

2. The apparatus of claim 1, further comprising:
a photodetector positioned to receive the transmitted light, wherein the photodetector is configured to generate an electrical signal deterministic of the one or more optical characteristics of the transmitted light, and wherein the one or more optical characteristics of the transmitted light includes at least an amplitude of the transmitted light.

3. The apparatus of claim 2, further comprising:
a controller electrically connected to the photodetector, wherein the controller is configured to determine a characteristic of the fluid sample based at least in part on the electrical signal received from the photodetector.

4. The apparatus of claim 3, wherein the controller determines an absorption signature based at least in part on the amplitude of the transmitted light at a subset of frequency comb wavelengths of the plurality of frequency comb wavelengths.

5. The apparatus of claim 4, wherein the characteristic of the fluid sample is determined based at least in part on the absorption signature.

6. The apparatus of claim 1, wherein the characteristic of the fluid sample is a concentration of a target gas.

7. The apparatus of claim 1, wherein the frequency comb illumination source is configured to emit the pulsed light at a pulse repetition rate.

8. The apparatus of claim 7, wherein the pulse repetition rate of the frequency comb illumination source matches a free spectral range of the optical cavity.

9. The apparatus of claim 1, wherein the frequency comb illumination source is a dual frequency comb spectroscopy illumination source.

10. The apparatus of claim 1, wherein the optical cavity comprises two or more mirror elements.

11. The apparatus of claim 1, wherein configuring the optical cavity in the at least one cavity resonance mode comprises modifying a physical characteristic of the optical cavity, wherein the physical characteristic comprises at least one of a reflectivity of the two or more mirror elements, an index of refraction of a component within the optical cavity, and an optical cavity length of the transmitted light within the optical cavity.

12. A method for determining a characteristic of a target gas in a fluid sample, the method comprising:

causing a frequency comb illumination source to emit pulsed light comprising a plurality of frequency comb wavelengths, wherein the pulsed light is directed at an optical cavity comprising a plurality of cavity resonance modes, and wherein the fluid sample is disposed within the optical cavity;

adjusting a physical characteristic of the optical cavity to configure the optical cavity in at least one cavity resonance mode of the plurality of cavity resonance modes; and adjusting a physical characteristic of the pulsed light, based on the at least one configured cavity resonance mode of the optical cavity, to align a frequency comb wavelength of the plurality of frequency comb wavelengths with the at least one cavity resonance mode of the plurality of cavity resonance modes of the optical cavity, receiving, from a photodetector positioned to receive a transmitted light, an electrical signal proportional to an amplitude of the transmitted light, wherein the transmitted light passes through the fluid sample within the optical cavity; and determining a characteristic of the fluid sample based on the electrical signal.

13. The method of claim 12, further comprising:

determining an absorption signature based at least in part on the amplitude of the transmitted light at a subset of frequency comb wavelengths of the plurality of frequency comb wavelengths.

14. The method of claim 13, further comprising:

determining the characteristic of the fluid sample based at least in part on the absorption signature.

15. The method of claim 12, wherein the characteristic of the fluid sample is a concentration of a target gas.

16. The method of claim 12, wherein the frequency comb illumination source is configured to emit the pulsed light at a pulse repetition rate, and wherein the pulse repetition rate of the frequency comb illumination source matches a free spectral range of the optical cavity or a multiple thereof.

17. The method of claim 16, wherein the frequency comb illumination source is a dual frequency comb spectroscopy illumination source.

18. The method of claim 12, further comprising adjusting a physical characteristic of the optical cavity to modify the plurality of cavity resonance modes, such that one or more comb wavelengths are resonant within the optical cavity.

19. A system for determining a concentration of a target gas within a fluid sample, the system comprising:

a fluid sample intake, configured to receive the fluid sample into a fluid sample chamber;

an optical cavity operable in a plurality of cavity resonance modes, wherein a portion of the fluid sample chamber is within the optical cavity;

a frequency comb illumination source configured to emit pulsed light comprising a plurality of frequency comb wavelengths;

a photodetector positioned to receive transmitted light passing through the portion of the fluid sample chamber within the optical cavity, wherein the photodetector is configured to generate an electrical signal proportional to an amplitude of the transmitted light; and a controller electrically connected to the photodetector, wherein the controller is configured to:

adjust a physical characteristic of the optical cavity to configure the optical cavity in at least one cavity resonance mode of the plurality of cavity resonance modes, and adjust a physical characteristic of the pulsed light based on the at least one configured cavity resonance mode of the optical cavity, to align a frequency comb wavelength of the plurality of frequency comb wavelengths with the at least one cavity resonance mode of the plurality of cavity resonance modes of the optical cavity, wherein the physical characteristic comprises a frequency comb wavelength, and wherein the controller is configured to determine the concentration of the target gas within the fluid sample based on the electrical signal received from the photodetector.

* * * * *